(12) United States Patent
Gong (10) Patent No.: US 9,917,521 B1
(45) Date of Patent: Mar. 13, 2018

(54) POWER LIMITING FOR FLYBACK CONVERTER

(71) Applicant: Infineon Technologies Austria AG, Villach (AT)

(72) Inventor: Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/266,516

(22) Filed: Sep. 15, 2016

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 2001/0009* (2013.01); *H02M 2001/0025* (2013.01)

(58) Field of Classification Search
CPC ......... H02M 2001/0025; H02M 3/335; H02M 3/33507; H02M 3/33515; H02M 3/33523
See application file for complete search history.

(56) References Cited

U.S. PATENT DOCUMENTS

| | | | |
|---|---|---|---|
| 6,665,197 B2 | 12/2003 | Gong et al. | |
| 6,674,656 B1 | 1/2004 | Yang et al. | |
| 2008/0067993 A1* | 3/2008 | Coleman | H02M 1/08 323/282 |
| 2009/0256545 A1* | 10/2009 | Wang | H02M 3/33507 323/299 |
| 2010/0157636 A1 | 6/2010 | Li et al. | |
| 2011/0002147 A1* | 1/2011 | Fukui | H02M 3/33507 363/21.12 |
| 2013/0058135 A1* | 3/2013 | Marino | H02M 3/33507 363/21.02 |
| 2013/0070379 A1* | 3/2013 | Pan | H02H 3/006 361/87 |
| 2014/0252990 A1* | 9/2014 | Maru | H02M 3/33507 315/307 |

* cited by examiner

*Primary Examiner* — Harry Behm
(74) *Attorney, Agent, or Firm* — Shumaker & Sieffert, P.A.

(57) ABSTRACT

A controller of a power converter is described that after switching-on a primary switch of a power converter, detects a voltage that is indicative of a primary current through the primary switch and responsive to determining that the voltage exceeds a direct-current (DC) voltage threshold, switches-off the primary switch. The controller stores a peak value of the voltage while switching-off the primary switch, and responsive to determining that the peak value is higher or lower than a range of target values associated with the peak value of the voltage, the controller adjusts at least one of the DC voltage threshold or the range of target values for a subsequent switching cycle of the primary switch.

18 Claims, 4 Drawing Sheets

POWER LIMITING FOR FLYBACK CONVERTER

TECHNICAL FIELD

This disclosure relates to power converters, and more particular, techniques related to power limitation of flyback power converters.

BACKGROUND

Switch mode voltage converters, regulators, or power supplies may be used to provide a regulated DC output voltage from an unregulated AC or DC input voltage. A flyback type switch mode power supply (SMPS) (also referred to herein as simply a "flyback") may regulate an output voltage based on the primary current flowing through a primary switch connected in series with a primary winding of a transformer. A drive circuit of the flyback may generate a pulse to switch-on the power switch to build up energy in the primary winding that is to be transferred to a secondary winding of the transformer. While the primary switch is switched-on, the inductance of the primary winding of the transformer may cause the level of the primary current flowing through the primary switch to increase substantially linearly. When the drive circuit determines the primary current level has reached a specific threshold, the drive circuit may cause the primary switch to switch-off and cease conducting the primary current.

During operation, so as to prevent damage to the primary switch and/or to prevent damage to a load connected to the secondary winding, a flyback may limit the primary current through the primary switch to a maximum permissible current level. The maximum permissible current level may depend on the input voltage to the flyback and the amount of load that is connected to a secondary side of the transformer. As operating conditions (e.g., input voltage and amount of primary inductance) of a flyback change, the acceptable maximum primary current level for the flyback may also change thereby causing a previously acceptable maximum primary current level to no longer be acceptable for a particular application and at a particular time.

SUMMARY

In general, circuits and techniques are described for enabling a SMPS (e.g., a flyback) to adjust its maximum power output limitation by dynamically tuning a maximum current level of a primary current that the SMPS allows to flow through a primary switch during a subsequent switching-cycle. For example, over time, the input voltage to the SMPS or the amount of primary inductance may vary (e.g., either over time or as the SMPS provides power from one system to another system), thereby causing what was previously being used as an acceptable maximum primary current level, to no longer be appropriate for a particular application, at a particular time. That is, what was previously a permissible maximum power output limitation, may now result, due to a change in input voltage or primary inductance, in thermal overloading of the primary switch and/or an excessively high output voltage that may oversupply the load.

As such, the example SMPS may regularly evaluate (e.g., after each switching cycle) whether the maximum primary current restriction being placed on the primary switch is still appropriate for subsequent switching-cycles of the primary switch or if the maximum primary current restriction should be increased or decreased. For example, if the SMPS determines that the maximum primary current restriction was too low for a previous switching-cycle of the primary switch, the SMPS may increase the maximum primary current restriction for a next switching-cycle of the primary switch. And if the SMPS determines that the maximum primary current restriction was too high for the previous switching-cycle of the primary switch, the SMPS may decrease the maximum primary current restriction for the next switching-cycle of the primary switch. And if the SMPS determines that the maximum primary current restriction was not too high and not too low for the previous switching-cycle of the primary switch, the SMPS may maintain the maximum primary current restriction at its current level for the next switching-cycle of the primary switch.

In one example, the disclosure is directed to a power circuit comprising: a transformer arranged to store energy between a primary-side of the power circuit and a secondary-side of the power circuit; a primary switch coupled to a primary-side winding of the transformer; and a controller configured to: switch-on the primary switch during a current switching cycle; responsive to determining that a voltage indicative of a primary current through the primary switch exceeds a direct-current (DC) voltage threshold, switch-off the primary switch during the current switching cycle; responsive to determining that a peak value of the voltage during the current switching cycle is higher or lower than a target value associated with the peak value of the voltage, adjust at least one of the DC voltage threshold or the target value for a subsequent switching cycle of the primary switch.

In another example, the disclosure is directed to a power circuit comprising: means for switching-on a primary switch of a power converter; means for detecting a voltage that is indicative of a primary current through the primary switch; means for determining whether the voltage exceeds a direct-current (DC) voltage threshold, means for switching-off the primary switch in response to determining that the voltage exceeds the DC voltage threshold; means for determining whether a peak value of the voltage while switching-off the primary switch; and means for adjusting at least one of the DC voltage threshold or the range of target values for a subsequent switching cycle of the primary switch in response to determining that the peak value is higher or lower than a range of target values associated with the peak value of the voltage.

In another example, the disclosure is directed to a method that includes: after switching-on a primary switch of a power converter, detecting, by a controller, a voltage that is indicative of a primary current through the primary switch; responsive to determining that the voltage exceeds a direct-current (DC) voltage threshold, switching-off, by the controller, the primary switch; storing, by the controller, a peak value of the voltage while switching-off the primary switch; and responsive to determining that the peak value is higher or lower than a range of target values associated with the peak value of the voltage, adjusting, by the controller, at least one of the DC voltage threshold or the range of target values for a subsequent switching cycle of the primary switch.

The details of one or more examples are set forth in the accompanying drawings and the description below. Other features, objects, and advantages of the disclosure will be apparent from the description and drawings, and from the claims.

DETAILED DESCRIPTION

Figure 1:
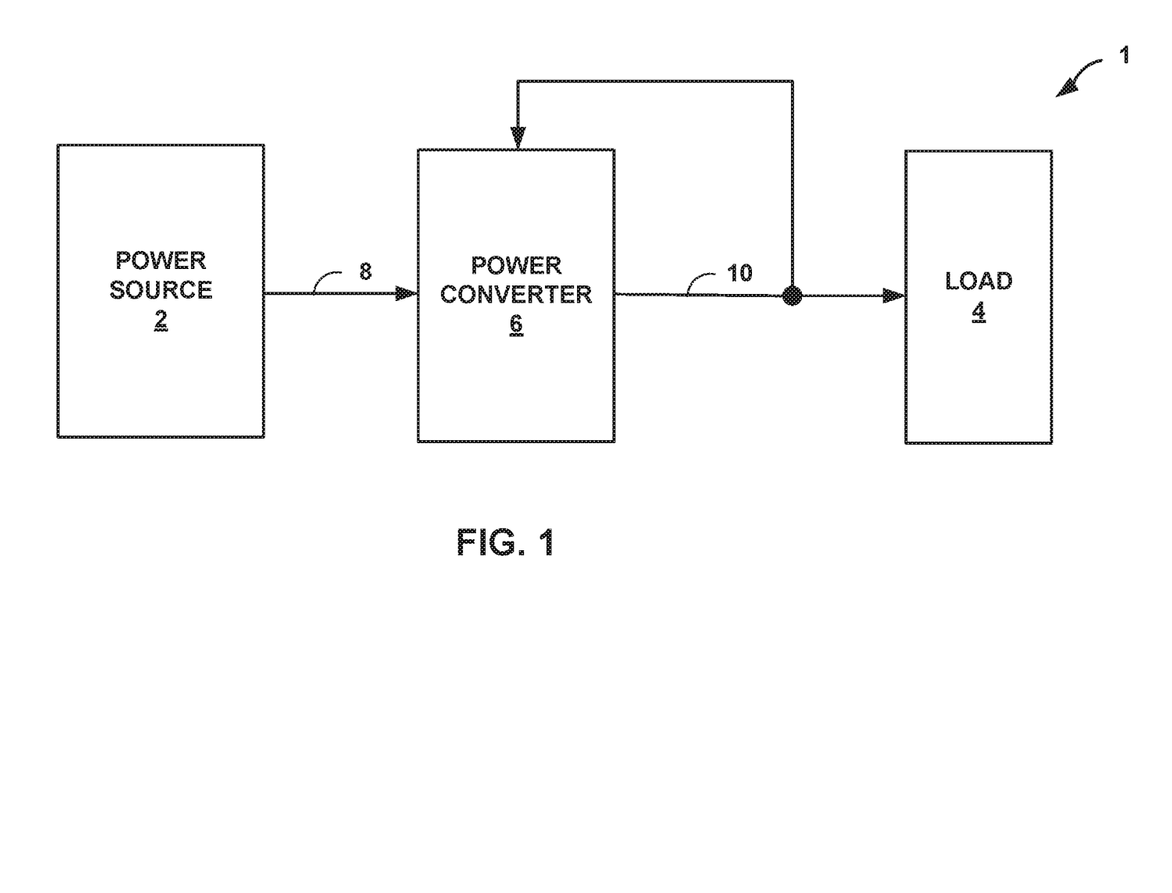
FIG. 1 is a block diagram illustrating an example system for converting power from a power source, in accordance with one or more aspects of the present disclosure.

FIG. 1 is a block diagram illustrating an example system for converting power from a power source, in accordance with one or more aspects of the present disclosure.

FIG. 1 shows system 1 as having three separate and distinct components shown as power source 2, power converter 6, and load 4, however system 1 may include additional or fewer components. Power source 2, power converter 6, and load 4 may be three individual components or may represent a combination of one or more components that provide the functionality of system 1 as described herein.

System 1 includes power source 2 which provides electrical power to system 1. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

System 1 includes power converter 6 which operates as a flyback. Power converter 6 may include one or more transformers to convert the power input at the primary-side of the one or more transformers into a power output to load 4 coupled to a secondary-side of the one or more transformers.

System 1 further includes load 4. Load 4 receives the electrical power (e.g., voltage and current) converted by power converter 6. In some examples, the power converted by power converter 6 passes through a filter (not shown) before reaching load 4. In some examples, the filter is a sub-component of power converter 6, an external component of power converter 6, and/or a sub-component of load 4. In any event, load 4 (also sometimes referred to herein as device 4) may use the filtered or unfiltered electrical power from power converter 6 to perform a function.

Numerous examples of load 4 exist and may include, but are not limited to, computing devices and related components, such as microprocessors, electrical components, circuits, laptop computers, desktop computers, tablet computers, mobile phones, batteries, speakers, lighting units, automotive/marine/aerospace/train related components, motors, transformers, or any other type of electrical device and/or circuitry that receives a voltage or a current from a power converter.

Power source 2 may provide electrical power with a first voltage and current level over link 8. Load 4 may receive electrical power that has a second voltage and current level, converted by power converter 6, over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4. In addition, link 10 provides a feedback loop or circuit for carrying information to power converter 6 associated with the characteristics of the power output received by load 4.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10.

Load 4 may receive the power that has the second voltage level at link 10. Load 4 may use the power having the second voltage level to perform a function (e.g., power a microprocessor, charge a battery, etc.). Power converter 6 may receive information over link 10 associated with the power that has the second voltage level. For instance, feedback control (e.g., current sensing) circuitry of power converter 6 may detect the voltage or current level of the power output at link 10 and a control unit of converter 6 may adjust the power output at link 10 based on the detected voltage or current level to cause the filtered power output to have a different voltage or current level that fits within a voltage or current level tolerance window required by load 4.

Figure 2:
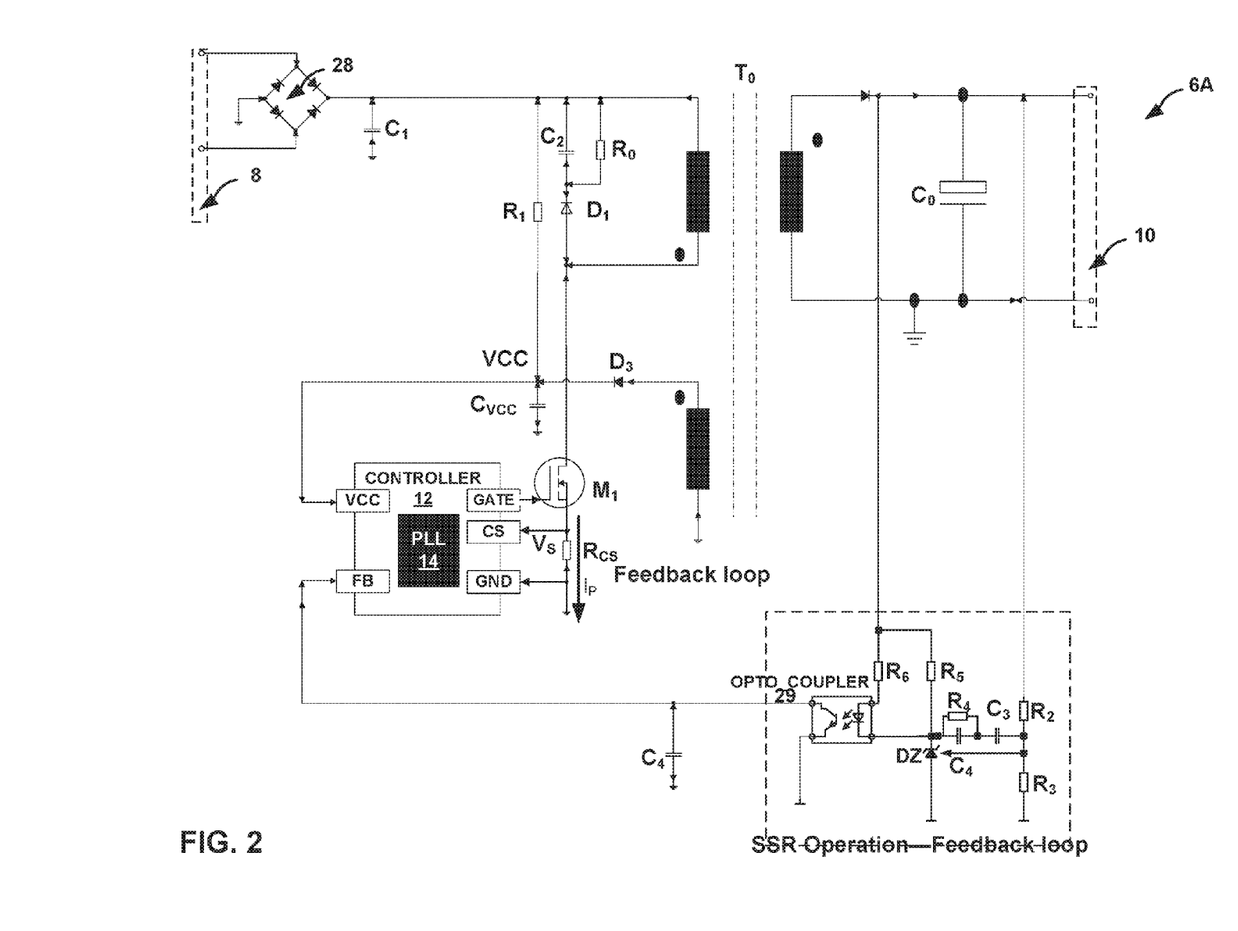
FIG. 2 is a circuit diagram illustrating an example power converter, of the example system shown in FIG. 1, which is configured to dynamically adjust a maximum power output limitation of the example power converter, in accordance with one or more aspects of the present disclosure.

FIG. 2 is a circuit diagram illustrating power converter 6A as an example power converter, of the example system shown in FIG. 1, which is configured to dynamically adjust a maximum power output limitation of the example power converter, in accordance with one or more aspects of the present disclosure. Power converter 6A includes transformer T0. Transformer T0 provides isolation between a primary-side of power converter 6A and a secondary-side of power converter 6A. Transformer T0 includes a primary winding, a secondary winding, and a feedback winding.

The primary-side of power converter 6A is configured to receive a voltage input (e.g., from source 2 as shown in FIG. 1) at link 8. The primary-side of power converter 6A includes controller 12, rectifier 28, capacitors C1, C2, CVCC, and C4, resistors R0, R1, and RCS, diodes DI and D3, the primary and feedback windings of transformer T0, and primary switch (e.g., power MOSFET) M1.

The secondary-side of power converter 6A is configured to produce a voltage output (e.g., for powering load 4 as shown in FIG. 1) at link 10. The secondary-side of power converter 6A includes the secondary winding of transformer T0, output capacitor C0, and a Secondary Side Regulation (SSR) operation feedback loop. The SSR operation feedback loop includes resistors R2-R6, capacitor C4, Zener diode DZ (e.g., an operational amplifier with its negative input to be at an internally fixed voltage), and opto-coupler 29.

Controller 12 is configured to control the gate of primary switch M1 to cause power converter 6A to convert an input voltage at link 8 into an output voltage at link 10. Controller 12 may comprise any suitable arrangement of hardware, software, firmware, or any combination thereof, to perform the techniques attributed to controller 12 that are described herein. Controller 12 may include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 12 includes software or firmware, controller 12 further includes any necessary hardware for storing and executing the software or firmware, such as one or more memories and one or more processors or processing units. In general, a processing unit may include one or more microprocessors, DSPs, ASICs. FPGAs, or any other equivalent integrated or discrete logic circuitry, as well as any combinations of such components.

Controller 12 is configured to regulate the output voltage at link 10 by controlling the duty cycle of primary switch M1. Controller 12 includes power limitation logic unit (PLL) 14 that controller 12 uses to adjust a maximum power output limitation of power converter 6A by dynamically tuning a maximum primary current level of primary current $I_P$ that power converter 6A allows to flow through primary switch M1. Controller 12 may regulate an output voltage of power converter 6A (e.g., for powering load 4 at link 10) based upon an evaluation, by PLL 14, of the primary current $I_P$ flowing through primary switch M1.

In operation, controller 12 may output a switching pulse at the gate output of controller 12 to switch-on primary switch M1. For example, controller 12 may output a gate drive signal that is driven by an oscillator of controller 12 and increases from a low voltage (e.g., GND) to a high voltage (e.g., VCC, ten volts, or some other high voltage) to cause primary switch M1 to begin conducting current $I_P$. Due to the inductance of the primary winding of transformer T0, which is connected in series with primary switch M1, the current level of the current $I_P$ flowing through primary switch M1 may increase with a substantially linear rate of change.

PLL 14 of controller 12 is configured to regularly evaluate (e.g., after each switching cycle of primary switch M1) internal parameters of power converter 6A to determine an appropriate, value to assign to the maximum primary current threshold that controller 12 uses to limit the current $I_P$ flowing through primary switch M1. PLL 14 may share the value of the maximum primary current threshold with other components of controller 12 that determine when to switch off primary switch M1. For example, if based on an evaluation of the internal parameters for the previous switching cycle, PLL 14 determines that the maximum primary current threshold is too low, the PLL 14 may increase the maximum primary current threshold. And if PLL 14 determines that the maximum primary current threshold is too high based on an evaluation of the internal parameters for the previous switching cycle, PLL 14 may decrease the maximum primary current threshold. In this way, during a subsequent switching cycle, controller 12 may switch off primary switch M1 if the current $I_P$ flowing through primary switch M1 exceeds the adjusted (e.g., increased or decreased) maximum primary current threshold despite whether the current $I_P$ flowing through primary switch M1 exceeds the previous maximum primary current threshold that was provided to controller 12 from PLL 14 during the prior switching cycle.

Controller 12 may generate the gate drive signal to switch-off primary switch M1 in response to receiving, from a current measurement device of controller 12, a measurement signal indicating the current level of the current $I_P$ through primary switch M1. The measurement signal may indicate an instantaneously measured value of the current level of the current $I_P$ through primary switch M1. For example, controller 12 may monitor the voltage $V_S$ at the current sense input of controller 112. Controller 12 may determine the current level of the current $I_P$ by determining a ratio between the voltage $V_S$ and the resistance of resistor RCS.

Controller 12 may compare what may appear to be an instantaneously measured value of the current level of the current $I_P$ through primary switch M1 to the maximum primary current threshold (e.g., a constant reference signal that is independent of time) provided by PLL 14. If at any time while primary switch M1 is switched-on, the measurement value of the current level of the current $I_P$ through primary switch M1 exceeds the maximum primary current threshold provided by PLL 14, then a comparator circuit of controller 12 may cause controller 12 to switch off primary switch M1. For example, when the current level of the current $I_P$ reaches a maximum primary current threshold as determined by PLL 14, controller 12 may output a switching pulse at the gate output of controller 12 to switch-off primary switch M1. Controller 12 may output a gate drive signal that is driven by the oscillator of controller 12 and decreases from a high voltage (e.g., VCC, or some other high voltage level) to a low voltage (e.g., GND or some other low voltage level that is less than the high voltage level) to cause primary switch M1 to cease conducting current $I_P$.

The maximum output power P of power converter 6A can be expressed as shown below in Equations 1 and 2:

$$I_P = \frac{V_{IN}}{L_P} \times t_{ON} \qquad \text{(Equation 1)}$$

$$P = \frac{L_P}{2 \times T} \times I_P^2 = \frac{V_{IN}^2 \times t_{ON}^2}{2 \times L_P \times T} \qquad \text{(Equation 2)}$$

In Equations 1 and 2, the terms $I_P$ and $L_P$ are, respectively, the primary current through primary switch M1 and the primary inductance of the primary winding of transformer T0. The term $t_{ON}$ is the duration of the switch-on period of a drive signal (e.g., a pulse-width-modulation signal) from controller 12 during which primary switch M1 is switched on and conducting current $I_P$. The term T is the duration of the switching period of the drive signal from controller 12.

As shown by Equations 1 and 2, the output power P of power converter 6A will vary as the input voltage $V_{IN}$ (e.g., at link 8 from source 2) varies. Since the input voltage range of input voltage $V_{IN}$ vary from between AC 90V and 264V, the output power P limit of power converter 6A when the input voltage $V_{IN}$ is at the peak of the voltage range (AC 264V) may be many times higher than the output power P limit of power converter 6A when the input voltage $V_{IN}$ is at the minimum of the voltage range (AC 90V). Controller 12 may regulate the output power P (and the output voltage $V_{OUT}$) by automatically adjusting $t_{ON}$ (e.g., using feedback information obtained at the FB input of controller 12 from opto-coupler 29) to keep the output voltage $V_{OUT}$ within an acceptable voltage range for powering load 4.

There is however a time delay to associated with controller 12 that represents the amount of time from the moment when the voltage $V_S$ at the CS input of controller 12 indicates that the current $I_P$ flowing through primary switch M1 exceeds the maximum primary current threshold to the moment when the controller 12 causes the gate output of controller 12 to command primary switch M1 to switch-off. Within the time delay to, primary switch M1 remains switched-on and is conducting the current $I_P$. As a result, during time delay to, primary switch M1 will continue to delivering power (e.g., that gets passed on to load 4). Therefore, the maximum output power P delivered to load 4 during any given switching cycle of primary switch M1 is not only based on the switch-on period $t_{ON}$, but is also affected by the time delay to of controller 12, with the actual duration of the switch-on period of primary switch M1 being equal to $t_{ON}+t_O$, the actual output power P of power converter 6A is represented by Equation 3:

$$P = \frac{V_{IN}^2 \times (t_{ON} + t_D)^2}{2 \times L_P \times T} \quad \text{(Equation 3)}$$

Although the time delay to is typically short (e.g., generally within the range of 100 nsec to 300 ns), at higher operating frequencies the term to (even if short) can have a great impact on the overall output power P since the switch-on period $t_{ON}$ and switching period T at higher operating frequencies is also relatively short. As a result, minimizing the time delay to associated with controller 12 may be important for obtaining accurate maximum power limitation, particularly when operating power converter 6A in Discontinuous Current Mode (DCM).

Figure 3:
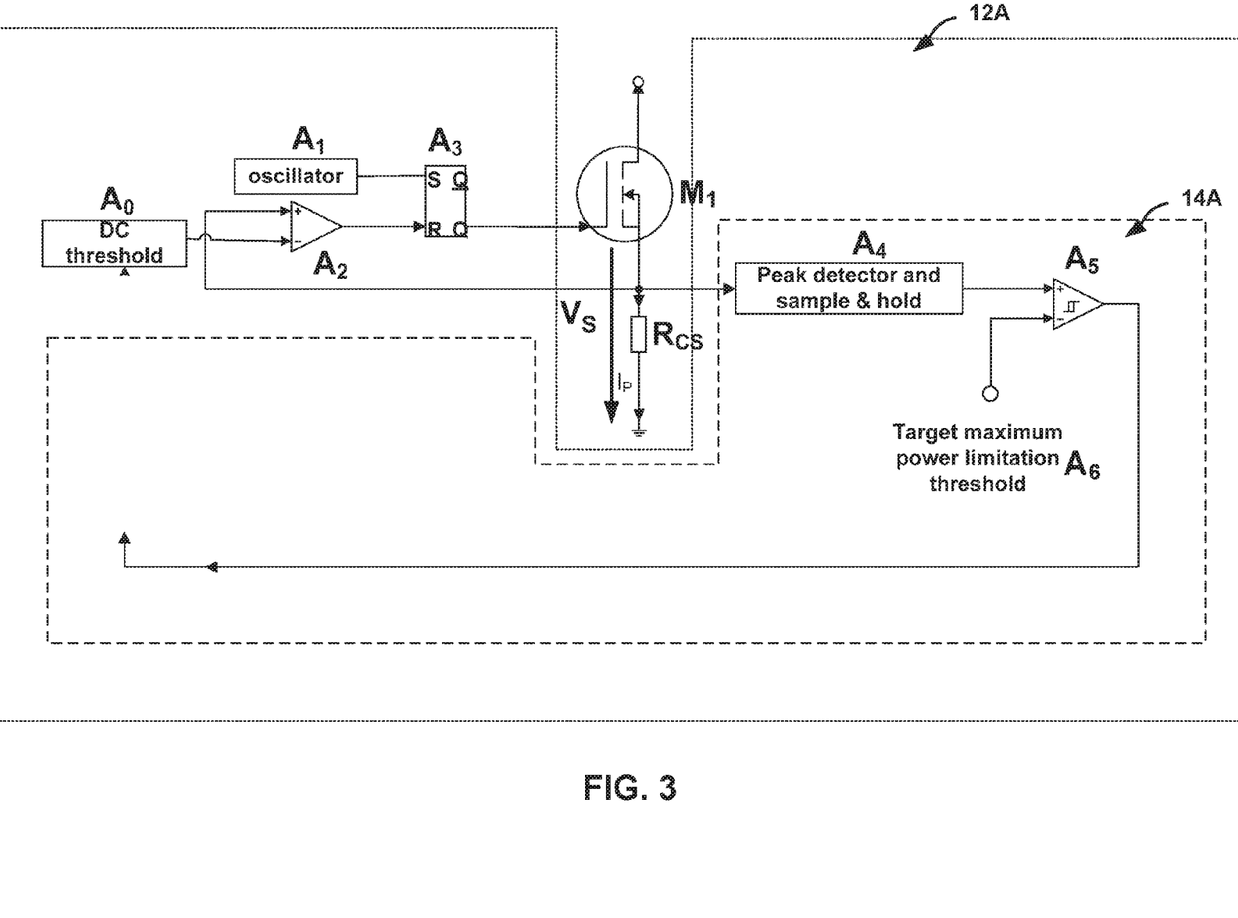
FIG. 3 is a conceptual diagram illustrating an example controller that includes example power limitation logic unit, of the example power converter shown in FIG. 2, which is configured to dynamically tune a maximum primary current limitation of the example power converter, in accordance with one or more aspects of the present disclosure.

FIG. 3 is a conceptual diagram illustrating controller 12A as an example controller that includes power limitation logic unit (PLL) 14A as an example of PLL 14, of the example power converter shown in FIG. 2, which is configured to dynamically tune a maximum primary current limitation of the example power converter, in accordance with one or more aspects of the present disclosure. FIG. 3 is described in the context of power converter 6A of FIG. 2 and the following derivations shown by Equations 1-3.

Controller 12A includes DC threshold unit A0, oscillator unit A1, SR latch A3, comparator unit A2, and PLL 14A. PLL 14A includes peak detector and sample & hold (PDSH) unit A4, differential comparator unit A5, and target maximum power limitation threshold (TMPLT) unit A6.

DC threshold unit A0 is configured to hold a maximum voltage value of $V_S$ when the primary current $I_P$ through primary switch M1 is at a maximum acceptable primary current level. The value stored by DC threshold unit A0 is determined by PLL 14A as an output from differential comparator A5.

Oscillator unit A1 and SR latch A3 are configured to generate a pulse-width-modulation or pulse-frequency-modulation signal at the gate terminal of primary switch M1 to cause primary switch A1 to switch-on at a particular frequency to regulate an output voltage at load 4. The frequency with which oscillator unit A1 causes primary switch M1 to switch-on varies the amount of power delivered by power converter 6A to load 4.

Comparator A2 receives as inputs a current voltage level $V_S$ and the maximum voltage value of $V_S$ being stored by DC threshold unit A0. In response to the current voltage $V_S$ exceeding the maximum voltage value of $V_S$ being stored by DC threshold unit A0, comparator A2 may cause SR latch A3 to reset thereby causing primary switch M1 to switch-off. Therefore, the greater the maximum voltage value of $V_S$ being stored by DC threshold unit A0, the longer primary switch M1 remains switched-on, which results in a greater amount of power being delivered by power converter 6A to load 4 during a single switching-cycle.

PDSH unit A4 is configured to sample and hold the maximum or peak value of $V_S$ during a current switching-cycle. TMPLT unit A6 is configured to store what PLL 14A had predetermined to be the maximum target (also referred to as "peak value") value of $V_S$ or range of maximum target values of $V_S$ for the current switching-cycle in order to ensure that power converter 6A operates within an acceptable maximum power limitation. That is, TMPLT unit A6 is configured to store the value or range of values of $V_S$ that corresponds to the target maximum current limitation threshold or range of maximum current limitation thresholds of converter 6A, for the current switching-cycle. PLL 14A predetermines the target value or values of $V_S$ based on the maximum value of $V_S$ during a previous switching-cycle. For example, the target value of $V_S$ may correspond to the peak value of $V_S$ observed for the previous switching cycle and the range of target values of $V_S$ may correspond to the peak value of $V_S$ for the previous switching cycle plus or minus two percent.

Differential comparator A5 is configured to compare the value stored by PDSH unit A4 for a current switching-cycle of primary switch M1, to the value or range of values stored by TMPLT unit A6 for the current switching-cycle of primary switch M1. PLL 14A uses the output of differential comparator A5 to adjust or not adjust the value stored by DC voltage threshold A0 prior to a subsequent switching-cycle of primary switch M1. PLL 14A uses the output of differential comparator A5 to adjust or not adjust the target value or range of target values of $V_S$ stored by TMPLT unit A6.

In accordance with techniques of this disclosure, although there may be some time delay to associated with controller 12A (e.g., due to comparator A2, SR latch A3, and the driver state of controller 12A to primary switch M1), the maximum power limitation or maximum peak current at which PLL 14A and controller 12A operates is very accurate. PLL 14A of controller 12A may automatically tune (incrementally increase or decrease) the maximum primary current limitation threshold associated with power converter 6A until the maximum primary current limitation threshold settles at a value that is best suited for the current application given the current input voltage $V_{IN}$ and the amount of primary inductance. Therefore, controller 12A may be more accurate limiting its maximum output power P than other power converters (e.g., that select between different dynamic voltage thresholds depending on a primary current slew rate).

For example, as an initial operation, oscillator unit A1 may cause SR latch A3 to output a positive-pulse voltage signal that gets sent by controller 12A as a gate drive signal to switch-on primary switch M1. The voltage level $V_S$ may increase from GND (e.g., zero volts) at a slew rate given by Equation 4:

$$V_{Sslewrate} = \frac{V_{IN}}{L_P} \times R_{CS} \quad \text{Equation 4}$$

The initial value stored by DC threshold unit A0 and TMPLT unit A6 may be one DC volt (or some other nominal DC voltage greater than GND). Then, after some propagation delay associated with units A1, A2, and A3, the voltage level $V_S$ signal may stop increasing at a peak value before suddenly decreasing back to GND (e.g., zero volts) after oscillator unit A1 causes SR latch A3 to output a zero-pulse voltage signal that gets sent by controller 12A as a gate drive signal to switch-off primary switch M1.

PDSH unit A4 may sample and hold the peak value that $V_S$ achieved just prior to dropping back to GND. Using differential comparator unit A5, PLL 14A may compare the peak value of $V_S$ to the target value (or range of target values) associated with $V_S$ that corresponds to the target maximum current limitation threshold stored by TMPLT unit A6. If the peak value of $V_S$ during a current switching cycle of primary switch M1 is lower than the target value (or range of target values) associated with $V_S$, PLL 14A may increase the value stored at DC threshold unit A0 for the next switching cycle of primary switch M1. However, if the peak value of $V_S$ during a current switching cycle of primary switch M1 is higher than the target value (or range of target values) associated with $V_S$, PLL 14A may decrease the value stored at DC threshold unit A0 for the next switching cycle of primary switch M1. If however, the peak value of $V_S$ during a current switching cycle of primary switch M1 is not higher and not lower than the target value (or range of target values) associated with $V_S$, PLL 14A may maintain the value stored at DC threshold unit A0 for the next switching cycle of primary switch M1. PLL 14A may adjust the target value (or range of target values) associated with $V_S$ being stored by TMPLT unit A6 according to any adjustment made to the value stored at DC threshold unit A0. By tuning the value stored at DC threshold unit A0 in this way, controller 12A may be able to control power converter 6A with a maximum power limitation that has a very high accuracy (e.g., depending on the control limit tolerance).

Figure 4:
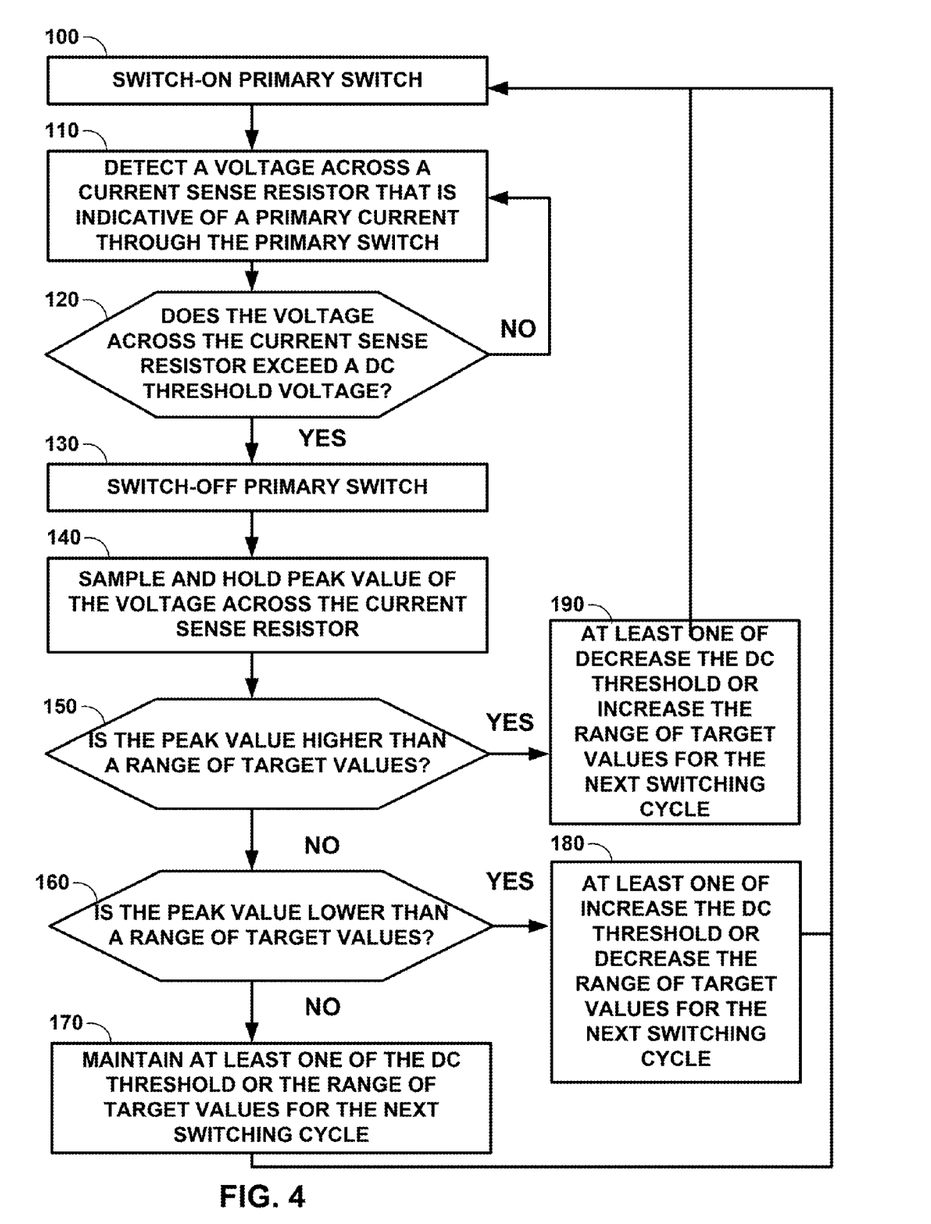
FIG. 4 is a flowchart illustrating example operations of an example power converter, of the example system shown in FIG. 1, which is configured to dynamically adjust a maximum power output limitation of the example power converter, in accordance with one or more aspects of the present disclosure.

FIG. 4 is a flowchart illustrating operations 100-190 as example operations of an example power converter, of the example system shown in FIG. 1, which is configured to dynamically adjust a maximum power output limitation of the example power converter, in accordance with one or more aspects of the present disclosure. For ease of description, FIG. 4 is described below in the context of controller 12 and power converter 6A of FIG. 2 as well as controller 12A of FIG. 3. FIG. 4 shows one example of the order in which operations 100-190 may be performed. In other examples, operations 100-190 may be performed in a different order than that shown in FIG. 4.

In operation, controller 12 may switch-on primary switch M1 (100). For example, oscillator unit A1 of controller 12A may cause SR latch A3 to output a positive voltage signal. In response, controller 12A may drive the gate of primary switch M1 with a positive voltage to cause primary switch M1 to switch-on and conduct primary current $I_P$.

Controller 12 may detect a voltage $V_S$ across a current sense resistor RCS that is indicative of a primary current $I_P$ through primary switch M1 (110). For example, comparator A2 of controller 12A may receive an indication of the voltage level $V_S$ as an input as the voltage level $V_S$ increases following the switch-on of primary switch M1.

Controller 12 may determine whether the voltage across the current sense resistor RCS exceeds a direct-current (DC) voltage threshold (120). For example, DC threshold unit A0 may store an expected value of $V_S$ when the primary current $I_P$ through primary switch M1 reaches a maximum primary current threshold associated with power converter 6A. TMPLT unit A6 may initially store a similar expected value or range of expected values being stored by DC threshold unit A0.

DC threshold unit A0 may initially store a nominal value greater than zero (e.g., one volt). Over time, by performing operations 130-140 below, the value stored by DC threshold unit A0 may settle at an expected value of $V_S$ that is tuned, and best suited, for the current operating environment of power converter 6A (e.g., the particular input voltage $V_{IN}$ and/or amount value of primary inductance). Comparator unit A2 of controller 12A may receive the value stored by DC threshold unit A0 as an additional input to the detected value of $V_S$. The output of comparator unit A2 may be the result of the comparison between the sensed voltage $V_S$ and the expected voltage $V_S$ when the primary current $I_P$ through primary switch M1 is at a maximum primary current threshold associated with power converter 6A.

If the voltage across the current sense resistor RCS does not exceed the DC voltage threshold (120, NO), controller 12 may continue to detect the voltage $V_S$ across the current sense resistor RCS that is indicative of primary current $I_P$ through primary switch M1 (110). For example, if the output from comparator unit A2 indicates that the measured voltage $V_S$ does not exceed the expected value of $V_S$ when the primary current $I_P$ through primary switch M1 is at a maximum primary current threshold, then primary switch M1 may remain switched-on. However, if the voltage across the current sense resistor RCS does exceed the DC voltage threshold (120, YES), controller 12 may switch-off primary switch M1 (130). For example, if the output from comparator unit A2 indicates that the measured voltage $V_S$ does exceed the expected value of $V_S$ when the primary current $I_P$ through primary switch M1 is at a maximum primary current threshold, then SR latch unit A3 may reset causing controller 12A to drive the gate of primary switch M1 with a zero voltage to cause primary switch M1 to switch-off and to stop conduct primary current $I_P$. Controller 12 may switch-off primary switch M1 (130).

Controller 12 may sample and hold a peak value of the voltage across the current sense resistor (140). For example, due to some propagation delay associated with the components of controller 12, the voltage $V_S$ may continue to increase beyond the DC voltage threshold even after the SR latch unit A3 resets and before primary switch M1 completely switches-off. PSDH unit A4 of PLL 14A may sample and hold (e.g., record and store) the peak value of $V_S$ during the propagation delay.

Controller 12 may determine whether the peak value of the voltage across the current sense resistor is higher than a range of target values (150), and if not (150, NO), whether the peak value of the voltage across the current sense resistor is lower than the range of target values (160). For example, differential comparator unit A5 may compare the peak value of $V_S$ that is stored by PSDH unit A4 to the expected peak value or range of expected peak values of $V_S$ being stored by TMPLT unit A6. If the peak value of $V_S$ during a current switching cycle of primary switch M1 is higher than the target value (or range of target values) associated with $V_S$ (150, YES), PLL 14A may decrease, based on the output from differential comparator unit A5, the value stored at DC threshold unit A0 for the next switching cycle of primary switch M1 (190).

If controller 12 determines that the peak value of the voltage across the current sense resistor is not higher than the range of target values (150, NO), then controller 12 may determine whether the peak value of the voltage across the current sense resistor is lower than the range of target values (160). If the peak value of $V_S$ during a current switching cycle of primary switch M1 is lower than the target value (or range of target values) associated with $V_S$ (160, YES), then PLL 14A may increase, based on the output from differential comparator unit A5, the value stored at DC threshold unit A0 for the next switching cycle of primary switch M1 (180).

If however, the peak value of $V_S$ during a current switching cycle of primary switch M1 is not higher and not lower than the target value (or range of target values) associated with $V_S$, PLL 14A may maintain the value stored at DC threshold unit A0 for the next switching cycle of primary switch M1 (170). That is, while PLL 14A may adjust the target value (or range of target values) associated with $V_S$ being stored by TMPLT unit A6 according to any adjustment made to the value stored at DC threshold unit A0, PLL 14A may refrain from adjusting the value stored by DC threshold unit A0 if not adjustment is needed. By tuning the value stored at DC threshold unit A0 in this way, controller 12A may be able to control power converter 6A with a maximum power limitation that has a very high accuracy (e.g., depending on the control limit tolerance).

Clause 1. A power circuit comprising: a transformer arranged to store energy between a primary-side of the power circuit and a secondary-side of the power circuit; a primary switch coupled to a primary-side winding of the transformer; and a controller configured to: switch-on the primary switch during a current switching cycle; responsive to determining that a voltage indicative of a primary current through the primary switch exceeds a direct-current (DC) voltage threshold, switch-off the primary switch during the current switching cycle; responsive to determining that a peak value of the voltage during the current switching cycle is higher or lower than a target value associated with the peak value of the voltage, adjust at least one of the DC voltage threshold or the target value for a subsequent switching cycle of the primary switch.

Clause 2. The power circuit of clause 1, further comprising a current sense resistor arranged in series between the primary switch and ground, wherein the controller is further configured to detect the voltage as a voltage across the current sense resistor.

Clause 3. The power circuit of any one of clauses 1-2 or combinations thereof, wherein the controller is further configured to: switch-on the primary switch during the subsequent switching cycle; responsive to determining that the voltage indicative of the primary current through the primary switch exceeds the adjusted DC voltage threshold, switch-off the primary switch during the subsequent switching cycle; responsive to determining that a peak value of the voltage during the subsequent switching cycle is higher or lower than the adjusted target value associated with the peak value of the voltage, further adjust at least one of the DC voltage threshold or the target value for a third switching cycle of the primary switch.

Clause 4. The power circuit of any one of clauses 1-3 or combinations thereof, wherein the controller is further configured to: responsive to determining that the peak value of the voltage during the current switching cycle is not higher and not lower than the target value associated with the peak value of the voltage, maintain the DC voltage threshold and the target value for the subsequent switching cycle of the primary switch.

Clause 5. The power circuit of any one of clauses 1-4 or combinations thereof, wherein the controller comprises a sample and hold unit configured to store the peak value of the voltage during the current switching cycle.

Clause 6. The power circuit of clause 5, wherein the sample and hold unit is configured to sample the voltage as the peak value while the primary switch is being switched-off.

Clause 7. The power circuit of any one of clauses 1-6 or combinations thereof, wherein the controller is configured to adjust at least one of the DC voltage threshold or the target value for the subsequent switching cycle of the primary switch by: increasing the DC voltage threshold or decreasing the target value, for the subsequent switching cycle of the primary switch in response to determining that the peak value of the voltage during the current switching cycle is lower than the target value associated with the peak value of the voltage.

Clause 8. The power circuit of any one of clauses 1-7 or combinations thereof, wherein the controller is configured to adjust at least one of the DC voltage threshold or the target value for the subsequent switching cycle of the primary switch by decreasing the DC voltage threshold or increasing the target value, for the subsequent switching cycle of the primary switch in response to determining that the peak value of the voltage during the current switching cycle is higher than the target value associated with the peak value of the voltage.

Clause 9. A method comprising: after switching-on a primary switch of a power converter, detecting, by a controller, a voltage that is indicative of a primary current through the primary switch; responsive to determining that the voltage exceeds a direct-current (DC) voltage threshold, switching-off, by the controller, the primary switch; storing, by the controller, a peak value of the voltage while switching-off the primary switch; and responsive to determining that the peak value is higher or lower than a range of target values associated with the peak value of the voltage, adjusting, by the controller, at least one of the DC voltage threshold or the range of target values for a subsequent switching cycle of the primary switch.

Clause 10. The method of clause 9, further comprising: responsive to determining that the peak value is not higher and not lower than the range of target values associated with the peak value of the voltage, maintaining, by the controller, at least one of the DC voltage threshold or the range of target values at a respective current value for the subsequent switching cycle of the primary switch.

Clause 11. The method of any one of clauses 9-10 or combinations thereof, wherein adjusting at least one of the DC voltage threshold or the range of target values for a subsequent switching cycle of the primary switch comprises: increasing, by the controller, a direct-current (DC) voltage threshold for the subsequent switching cycle of the primary switch in response to determining that the peak value is lower than the range of target values associated with the peak value of the voltage; or decreasing, by the controller, the range of target values for the subsequent switching cycle of the primary switch in response to determining that the peak value is lower than the range of target values associated with the peak value of the voltage.

Clause 12. The method of any one of clauses 9-11 or combinations thereof, wherein adjusting at least one of the DC voltage threshold and the range of target values for a subsequent switching cycle of the primary switch comprises: decreasing, by the controller, a direct-current (DC) voltage threshold for the subsequent switching cycle of the primary switch in response to determining that the peak value is higher than the range of target values associated with the peak value of the voltage; or increasing, by the controller, the range of target values for the subsequent switching cycle of the primary switch in response to determining that the peak value is higher than the range of target values associated with the peak value of the voltage.

Clause 13. The method of any one of clauses 9-12 or combinations thereof, wherein the voltage corresponds to a voltage across a current sense resistor that is arranged in series between the primary switch and ground.

Clause 14. The method of any one of clauses 9-13 or combinations thereof, wherein the DC voltage threshold corresponds to one volt during an initial switching cycle of the primary switch.

Clause 15. The method of any one of clauses 9-14 or combinations thereof, wherein the range of target values includes a range of voltages that are greater than, equal to, and less than the DC voltage threshold by approximately two percent.

Clause 16. A power circuit comprising: means for switching-on a primary switch of a power converter; means for detecting a voltage that is indicative of a primary current through the primary switch; means for determining whether the voltage exceeds a direct-current (DC) voltage threshold, means for switching-off the primary switch in response to determining that the voltage exceeds the DC voltage threshold; means for determining whether a peak value of the voltage while switching-off the primary switch; and means for adjusting at least one of the DC voltage threshold or the range of target values for a subsequent switching cycle of the primary switch in response to determining that the peak value is higher or lower than a range of target values associated with the peak value of the voltage.

Clause 17. The power circuit of clause 16, further comprising: means for maintaining at least one of the DC voltage threshold or the range of target values at a respective current value for the subsequent switching cycle of the primary switch in response to determining that the peak value is not higher and not lower than the range of target values associated with the peak value of the voltage.

Clause 18. The power circuit of any one of clauses 16-17 or combinations thereof, wherein the means for adjusting at least one of the DC voltage threshold or the range of target values for the subsequent switching cycle of the primary switch comprises means for increasing a direct-current (DC) voltage threshold for the subsequent switching cycle of the primary switch in response to determining that the peak value is lower than the range of target values associated with the peak value of the voltage or means for decreasing the range of target values for the subsequent switching cycle of the primary switch in response to determining that the peak value is lower than the range of target values associated with the peak value of the voltage.

Clause 19. The power circuit of any one of clauses 16-18 or combinations thereof, wherein the means for adjusting at least one of the DC voltage threshold or the range of target values for the subsequent switching cycle of the primary switch comprise means for decreasing a direct-current (DC) voltage threshold for the subsequent switching cycle of the primary switch in response to determining that the peak value is higher than the range of target values associated with the peak value of the voltage or means for increasing the range of target values for the subsequent switching cycle of the primary switch in response to determining that the peak value is higher than the range of target values associated with the peak value of the voltage.

Clause 20. The power circuit of any one of clauses 16-19 or combinations thereof, wherein the voltage corresponds to a voltage across a current sense resistor that is arranged in series between the primary switch and ground.

Clause 21. A power circuit comprising means for performing any one of the methods of clauses 9-15 or combinations thereof.

Clause 22. The power circuit of claim 1, wherein the controller is further configured to perform any one of the methods of clauses 9-15 or combinations thereof.

Clause 23. A computer-readable storage medium comprising instructions that, when executed by a controller of a power converter, cause the controller to perform any one of the methods of clauses 9-15 or combinations thereof.

Various examples have been described. These and other examples are within the scope of the following claims.

What is claimed is:

1. A power circuit comprising:
   a transformer arranged to store energy between a primary-side of the power circuit and a secondary-side of the power circuit;
   a primary switch coupled to a primary-side winding of the transformer; and
   a controller configured to:
      switch-on the primary switch during a current switching cycle;
      responsive to determining that a voltage indicative of a primary current through the primary switch exceeds a direct-current (DC) voltage threshold, switch-off the primary switch during the current switching cycle; and
      automatically tune, according to an input voltage and an amount of primary inductance at the primary-side winding, a maximum primary current limitation threshold associated with the primary switch by at least:
         responsive to determining that a peak value of the voltage during the current switching cycle is higher than a target value associated with the peak value of the voltage, increasing the target value for a subsequent switching cycle of the primary switch, wherein the target value is indicative of the maximum primary current limitation threshold; and
         responsive to determining that the peak value of the voltage during the current switching cycle is lower than the target value, decreasing the target value for the subsequent switching cycle of the primary switch.

2. The power circuit of claim 1, further comprising a current sense resistor arranged in series between the primary switch and ground, wherein the controller is further configured to detect the voltage as a voltage across the current sense resistor.

3. The power circuit of claim 1, wherein the controller is further configured to:
   switch-on the primary switch during the subsequent switching cycle; and
   automatically tune the maximum primary current limitation threshold associated with the primary switch by at least:
      responsive to determining that the voltage indicative of the primary current through the primary switch exceeds the DC voltage threshold, switch-off the primary switch during the subsequent switching cycle; and
      responsive to determining that a peak value of the voltage during the subsequent switching cycle is higher or lower than the target value associated with the peak value of the voltage, adjust at least one of the DC voltage threshold or the target value for a third switching cycle of the primary switch.

4. The power circuit of claim 1, wherein the controller is further configured to automatically tune the maximum primary current limitation threshold associated with the primary switch by at least:
   responsive to determining that the peak value of the voltage during the current switching cycle is not higher and not lower than the target value associated with the peak value of the voltage, maintain the at least one of the DC voltage threshold or the target value for the subsequent switching cycle of the primary switch.

5. The power circuit of claim 1, wherein the controller comprises a sample and hold unit configured to store the peak value of the voltage during the current switching cycle.

6. The power circuit of claim 5, wherein the sample and hold unit is configured to sample the voltage as the peak value while the primary switch is being switched-off.

7. The power circuit of claim 1, wherein the controller is configured to automatically tune the maximum primary current limitation threshold associated with the primary switch by at least adjusting at least one of the DC voltage threshold or the target value for the subsequent switching cycle of the primary switch by increasing a direct-current (DC) voltage threshold or decreasing the target value, for the subsequent switching cycle of the primary switch in response to determining that the peak value of the voltage during the current switching cycle is lower than the target value associated with the peak value of the voltage.

8. The power circuit of claim 1, wherein the controller is configured to automatically tune the maximum primary current limitation threshold associated with the primary switch by at least adjusting the at least one of the DC voltage threshold or the target value for the subsequent switching cycle of the primary switch by:
decreasing a direct-current (DC) voltage threshold in response to determining that the peak value of the voltage during the current switching cycle is higher than the target value associated with the peak value of the voltage.

9. A method comprising:
after switching-on a primary switch of a power converter, detecting, by a controller, a voltage that is indicative of a primary current through the primary switch;
responsive to determining that the voltage exceeds a direct-current (DC) voltage threshold, switching-off, by the controller, the primary switch;
storing, by the controller, a peak value of the voltage while switching-off the primary switch; and
automatically tuning, according to an input voltage and an amount of primary inductance at a primary-side winding of the power converter, a maximum primary current limitation threshold associated with the primary switch by at least:
increasing, by the controller, a range of target values for a subsequent switching cycle of the primary switch responsive to determining that a peak value of the voltage during the current switching cycle is higher than the range of target values associated with the peak value of the voltage, wherein the range of target values is indicative of the maximum primary current limitation threshold; and
decreasing, by the controller, the range of target values for the subsequent switching cycle of the primary switch responsive to determining that the peak value of the voltage during the current switching cycle is lower than the range of target values.

10. The method of claim 9, further comprising:
automatically tuning the maximum primary current limitation threshold associated with the primary switch by at least responsive to determining that the peak value is not higher and not lower than the range of target values associated with the peak value of the voltage, maintaining, by the controller, at least one of the DC voltage threshold or the range of target values at a respective current value for the subsequent switching cycle of the primary switch.

11. The method of claim 9, further comprising:
automatically tuning the maximum primary current limitation threshold associated with the primary switch by at least adjusting, by the controller, the DC threshold for the subsequent switching cycle of the primary switch by:
increasing, by the controller, the DC voltage threshold for the subsequent switching cycle of the primary switch in response to determining that the peak value is lower than the range of target values associated with the peak value of the voltage; or
decreasing, by the controller, the DC voltage threshold for the subsequent switching cycle of the primary switch in response to determining that the peak value is higher than the range of target values associated with the peak value of the voltage.

12. The method of claim 9, wherein the voltage corresponds to a voltage across a current sense resistor that is arranged in series between the primary switch and ground.

13. The method of claim 9, wherein the DC voltage threshold corresponds to one volt during an initial switching cycle of the primary switch.

14. The method of claim 9, wherein the range of target values includes a range of voltages that are greater than, equal to, and less than the DC voltage threshold by approximately two percent.

15. A power circuit comprising:
means for switching-on a primary switch of a power converter;
means for detecting a voltage that is indicative of a primary current through the primary switch;
means for determining whether the voltage exceeds a direct-current (DC) voltage threshold,
means for switching-off the primary switch in response to determining that the voltage exceeds the DC voltage threshold;
means for determining a peak value of the voltage while switching-off the primary switch; and
means for automatically tuning a maximum primary current limitation threshold associated with the threshold according to an input voltage and an amount of primary inductance at a primary-side winding, wherein the means for automatically tuning comprises:
means for increasing a range of target values for a subsequent switching cycle of the primary switch in response to determining that the peak value is higher than the range of target values associated with the peak value of the voltage, wherein the range of target values is indicative of the maximum primary current limitation threshold; and
means for decreasing the range of target values for the subsequent switching cycle of the primary switch in response to determining that the peak value of the voltage during the current switching cycle is lower than the range of target values.

16. The power circuit of claim 15, wherein the means for automatically tuning the maximum primary current limitation threshold associated with the primary switch comprise means for maintaining the at least one of the DC voltage threshold or the range of target values at a respective current value for the subsequent switching cycle of the primary switch in response to determining that the peak value is not higher and not lower than the range of target values associated with the peak value of the voltage.

17. The power circuit of claim 15, wherein the means for automatically tuning the maximum primary current limitation threshold associated with the primary switch comprises means for adjusting the DC voltage threshold for the subsequent switching cycle of the primary switch, the means for adjusting the DC voltage threshold for the subsequent switching cycle comprising:
- means for increasing the DC voltage threshold for the subsequent switching cycle of the primary switch in response to determining that the peak value is lower than the range of target values associated with the peak value of the voltage; or
- means for decreasing the DC voltage threshold for the subsequent switching cycle of the primary switch in response to determining that the peak value is higher than the range of target values associated with the peak value of the voltage.

18. The power circuit of claim 15, wherein the voltage corresponds to a voltage across a current sense resistor that is arranged in series between the primary switch and ground.

\* \* \* \* \*